(12) United States Patent
Barnes, III

(10) Patent No.: US 6,619,586 B1
(45) Date of Patent: Sep. 16, 2003

(54) THERMAL AIRSHIP BUOYANCY CONTROLLER

(76) Inventor: Alfred C. Barnes, III, 191 Avenida Elena, San Marcos, CA (US) 92069

( * ) Notice: Subject to any disclaimer, the term of this patent is extended or adjusted under 35 U.S.C. 154(b) by 0 days.

(21) Appl. No.: 09/994,334

(22) Filed: Nov. 26, 2001

Related U.S. Application Data
(60) Provisional application No. 60/250,411, filed on Nov. 30, 2000.

(30) Foreign Application Priority Data

Jun. 10, 2002 (JP) .......................... 2002-15551

(51) Int. Cl.$^7$ ................................................ B64B 1/64
(52) U.S. Cl. ........................................ 244/97; 244/30
(58) Field of Search .............................. 244/97, 30, 31, 244/96

(56) References Cited

U.S. PATENT DOCUMENTS

| | | | |
|---|---|---|---|
| 3,798,971 A | 3/1974 | Lowrance | |
| 3,957,228 A | 5/1976 | Kennedy, Jr. | |
| 4,082,239 A | * 4/1978 | Obermoller | 244/98 |
| 4,090,682 A | * 5/1978 | Parsons | 244/99 |
| 4,591,111 A | 5/1986 | Laughter | |
| 4,932,606 A | * 6/1990 | Conn | 244/33 |
| 5,042,748 A | * 8/1991 | Conn | 244/33 |
| 6,012,675 A | 1/2000 | Cocatre-Zilgien | |
| 6,119,979 A | * 9/2000 | Lee et al. | 244/97 |

FOREIGN PATENT DOCUMENTS

| | | | |
|---|---|---|---|
| JP | 403197298 A | * 8/1991 | 244/30 |
| WO | WO88/0055 | 1/1988 | |

* cited by examiner

*Primary Examiner*—Peter M. Poon
*Assistant Examiner*—Timothy D. Collins

(57) ABSTRACT

An automatic buoyancy controller is disclosed for management of lift in thermal airship 20. Data from envelope air temperature sensor 34 and ambient air temperature sensor 38 are input to difference processor 46 which transmits the calculated difference signal 48 to process controller 50/92. Comparing the operator selected difference temperature setpoint value 52 to difference signal 48, process controller 50/92 controls heater 44 operation in a way in which will equalize the comparison, thereby fixing the operator selected value of lift.

8 Claims, 5 Drawing Sheets

THERMAL AIRSHIP BUOYANCY CONTROLLER

This application claims the priority of U.S. provisional application Ser. No. 60/250,411, filed Nov. 30, 2000. As such, the specifications of the above mentioned U.S. provisional application are incorporated herein by reference in full.

FEDERALLY SPONSORED RESEARCH

Not Applicable

SEQUENCE LISTING OR PROGRAM

Not Applicable

BACKGROUND—FIELD OF THE INVENTION

This invention relates generally to the field of aviation, and more particularly to thermal airship buoyancy controller.

BACKGROUND—DESCRIPTION OF PRIOR ART

By virtue of a predetermined amount of lifting gas, traditional helium airships are "fixed" in terms of lift. Ascension and descension are accomplished with dynamic lift generated by changes in the pitch angle of the airfoil-shaped airship envelope and effected through the use of elevators.

Thermal airships derive lift by the means of heating the captive air within the airship hull. Ascension and descension are accomplished by changing the temperature of the captive air inside the airship envelope as a way of changing the value of lift desired rather than relying on dynamic generated lift. This process requires constant heat input to this captive medium to offset the radiant and convective losses incurred. The subsequent value of lift therefore, can inadvertently vary over time. Hot-air balloon burners are pilot operated and require a very acute and time-developed skill to achieve the desired flight control. Unintentional changes in pitch, and therefore dynamic generated lift, can confuse the airship pilot and cause erratic control. When additional airship control functions, such as engine throttle and rudder are added to this, the task becomes unmanageable for the airship pilot, and potentially dangerous.

When considering the thermal airship, it would be best to "fix" the difference between the internal air temperature of the envelope and the temperature of the air outside the airship envelope. This would eliminate the need for the airship pilot to constantly control the heat input necessary to maintain a thermal balance necessary for controlling the ascent or descent of the airship. Ascension and descension would be accomplished with dynamic lift through the use of elevators, therefore making the control similar to that of the helium airship.

With these requirements in mind, the inventor has designed a thermal airship buoyancy controller that "fixes" the difference between the internal air temperature of the airship envelope and the temperature of the outside air by using sensors to constantly sample the air both outside and inside the airship hull. This data is converted to a difference signal that is used as input for a process controller that manages the burner inputs. The pilot provides the processor with the desired difference temperature setpoint value and the processor constantly evaluates its performance and adjusts burn time to optimize the difference accuracy. The pilot, therefore, selects the desired amount of lift expressed as a difference temperature setpoint value, and the processor maintains this lift value automatically.

It has been found through the endeavors of the inventor and the patent search that there is no apparatus on the market and no apparent patents that have similar characteristics to the unique buoyancy controller devised by this inventor.

For example, U.S. Pat. No. 4,090,682 by Roger Parsons describes the use of a rudder and elevator system on a thermal airship and discloses that the pilot operated burner may be controlled "automatically" by a thermostatic sensor within the airship. However, there is no discussion of a closed loop control system that "fixes" the difference between the internal temperature of the envelope and the temperature of the outside air.

Also describing a very similar control system for a burner in a thermal airship, U.S. Pat. No. 4,087,239 by Douglas Obermoller discloses a thermocouple suspended within the envelope and a variable control of the fuel valve for the burner in order to maintain a predetermined temperature within the envelope. As with Parsons above, Obermoller does not disclose a closed loop control system that "fixes" the difference between the internal temperature of the envelope and the temperature of the outside air as does the applicant's invention.

No prior art teaches or suggests the particular novelty of the thermal airship buoyancy control processor of the present invention.

Objects and Advantages

In addition to the objects and advantages of the buoyancy control processor described in the above invention, several additional objects and advantages include:

(a) to provide a better system for burner operation for thermal airships;

(b) to provide a burner control system for thermal airships that reduces pilot demand and enhances overall control of the aircraft;

(c) to provide a burner control system for thermal airships that fixes the unit lift by fixing the difference temperature between the internal temperature of the airship envelope and the ambient temperature of the outside air;

(d) to provide a burner operating system that eliminates the pilot in the process of monitoring, maintaining and controlling the heat input to the airship envelope.

Other objects and advantages of the present invention will become apparent from the following descriptions, taken in connection with the accompanying drawings, wherein, by way of illustration and example, an embodiment of the present invention is disclosed. The drawings constitute a part of this specification and include exemplary embodiments to the invention, which may be embodied in various forms. It is to be understood that in some instances various aspects of the invention may be shown exaggerated or enlarged to facilitate an understanding of the invention.

SUMMARY OF THE INVENTION

In accordance with a preferred embodiment of the invention, the thermal airship buoyancy controller comprises an airship envelope air temperature sensor, an ambient air temperature sensor, and a means of establishing a differential temperature value of the envelope air temperature and the ambient air temperature data. A means of comparison between the differential temperature value and an operator selected difference temperature setpoint value is made such that a means of adding heat to the airship envelope air is initiated, or a means of adding heat to the airship envelope air is suspended as a way of equalizing the comparison.

DRAWINGS

Drawing Figures

Reference Numerals in Drawings

Figure 1:
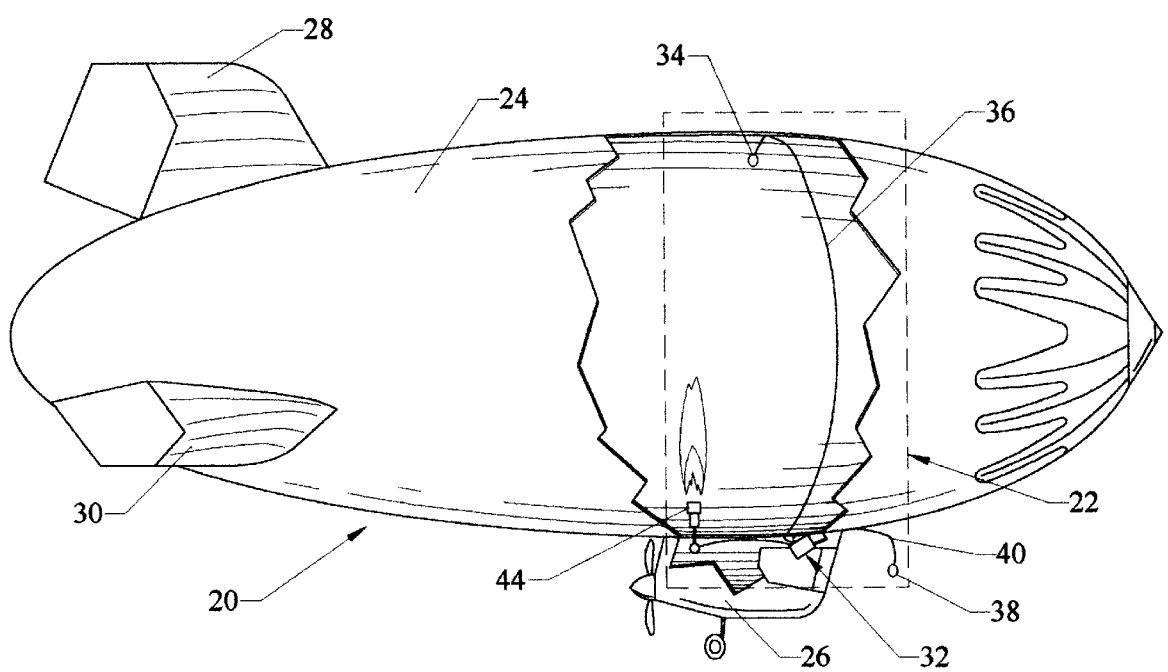
FIG. 1 is a side view of the airship illustrating the unique buoyancy controller, incorporating the sensors, heater, process controller assembly, and operator input unit.

AT Ambient sensor input
ΔT Analog difference output
ET Envelope sensor input
$T_1$ Time of heater activation
$T_2$ Time of heater deactivation
20 Thermal airship
22 Thermal airship buoyancy controller assembly
24 Airship envelope
26 Car
28 Vertical stabilizer/rudder
30 Horizontal stabilizer/rudder
32 Processor assembly
34 Envelope temperature sensor
36 Envelope sensor lead
38 Ambient temperature sensor
40 Ambient sensor lead
44 Heater
46 Difference processor
48 Temperature difference signal
50 Process controller
52 Operator selected difference temperature setpoint value
54 Processor output
56 Heater valve
58 Fuel line
60 Envelope air temperature plot
62 Ambient air temperature plot
64 Operator selected difference temperature setpoint plot
66 Difference temperature plot
68 Heater activation
70 Heater status plot
72 Processor under-shoot
74 Heater deactivation
76 Processor over-shoot
78 Ambient sensor reference junction
80 Envelope sensor reference junction
82 Ambient reference junction lead
84 Envelope reference junction lead
86 Envelope over-temperature alarm
88 Envelope over-temperature output lead
90 Over-temperature preset limit
92 Process controller with PID
94 High range alarm
96 Low range alarm
98 Temperature range preset limits
100 High range output lead
102 Low range output lead
104 Manually operated heater over-ride valve
106 Electrically activated heater over-ride
108 Proportional band
110 Heater ON cycle-time percentage plot
112 Offset integral
114 Reset

DETAILED DESCRIPTION

Description of the Preferred Embodiments—General

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

The present invention is better understood when taken in light of the accompanying drawings. FIG. 1 illustrates thermal airship 20 with thermal airship buoyancy controller assembly 22 installed within airship envelope 24 and car 26. Vertical stabilizer/rudder 28 and horizontal stabilizer/rudder 30 provide dynamic maneuvering of thermal airship 20 in flight while controlled heating of the captive air provides lift. The desired value of lift is controlled by processor assembly 32 which operates by comparing data from envelope air temperature sensor 34 transmitted via its lead 36 and data from ambient air temperature sensor 38 transmitted via its lead 40. Processor assembly 32 then controls heater 44 in a way that maintains the specific captive air temperature relative to that of the ambient air temperature as needed to achieve the desired value of lift.

Figure 2:
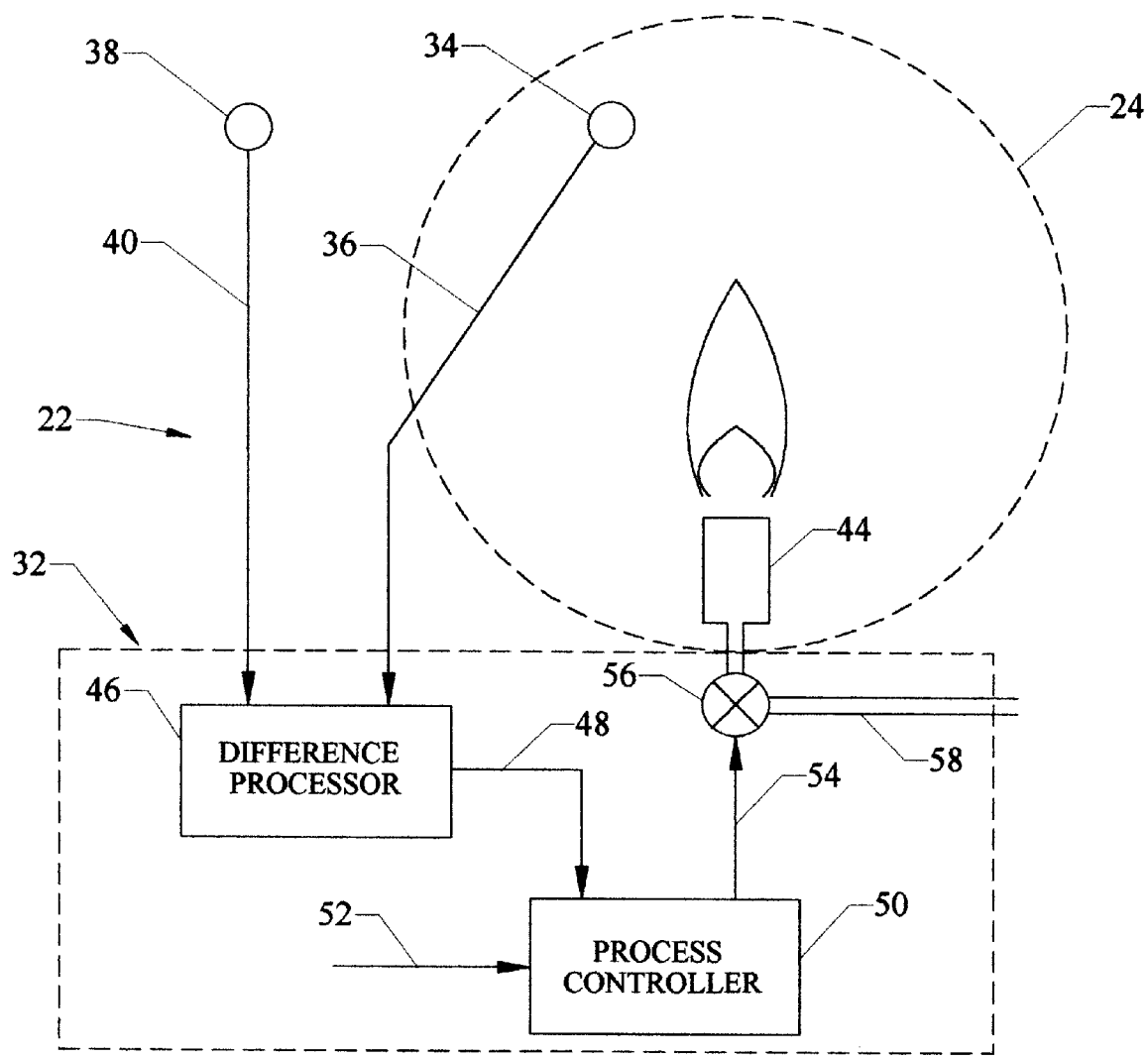
FIG. 2 is a block diagram of the general controller assembly.

FIG. 2 shows a block diagram that generally illustrates the preferred embodiments of thermal airship buoyancy controller assembly 22. Such a system utilizes processor assembly 32, which basically comprises difference processor 46 and process controller 50 to sample changes in both ambient and internal envelope temperatures.

Of the many temperature sensors that may be used in the measurement of both the captive air within thermal airship 20 and the ambient air around thermal airship, a typical, although not exclusive, sensor is the type T thermocouple. Envelope air temperature sensor 34 measures the captive air mass within airship envelope 24 and relays this information by way of envelope sensor leads 36 as one input to difference processor 46. Ambient air temperature sensor 38 measures the air temperature surrounding airship envelope 24 and relays this information by way of ambient sensor lead 40 as the other input to difference processor 46.

Of the various difference processors that may be used, a typical, although by not exclusive, difference processor incorporates two sensor inputs (for the purpose of the present example, envelope sensor input ET and ambient sensor input AT), an analog output expressed in a difference form (ET−AT=analog difference output ΔT), and the option of an input related alarm function. Included in this wide variety of difference processors, the processor sold under the trademark Newport™, model number INFCDT-411 INFINITY C Differential Thermocouple Meter with analog and control outputs, has thus far shown to fulfill the requirements described herein. Specifically, difference processor 46 calculates the difference between the two input signals, and transmits this difference by way of temperature difference signal 48 to the input of process controller 50.

Of the various process controllers that may be used, a typical, although not exclusive, controller incorporates operator setpoint 52 and the ability to produce an on and off output in response to changes in generated lift as represented by temperature difference signal 48 input. The process controller sold under the trademark Newport™, model number INFCP-411A INFINITY C Process Controller with analog and control outputs, has thus far shown to fulfill the requirements described herein. The pilot/operator programs process controller 50 with the desired difference temperature value as the operator selected difference temperature setpoint value 52 input. Process controller 50 compares measured temperature difference signal 48 to that of operator selected difference temperature setpoint value 52 and initiates processor output 54 based on the relative nature, of this comparison. Processor output 54 controls heater valve 56, which when activated, initiates the flow of fuel through fuel line 58 to heater 44, thus raising the captive air temperature.

Figure 3:
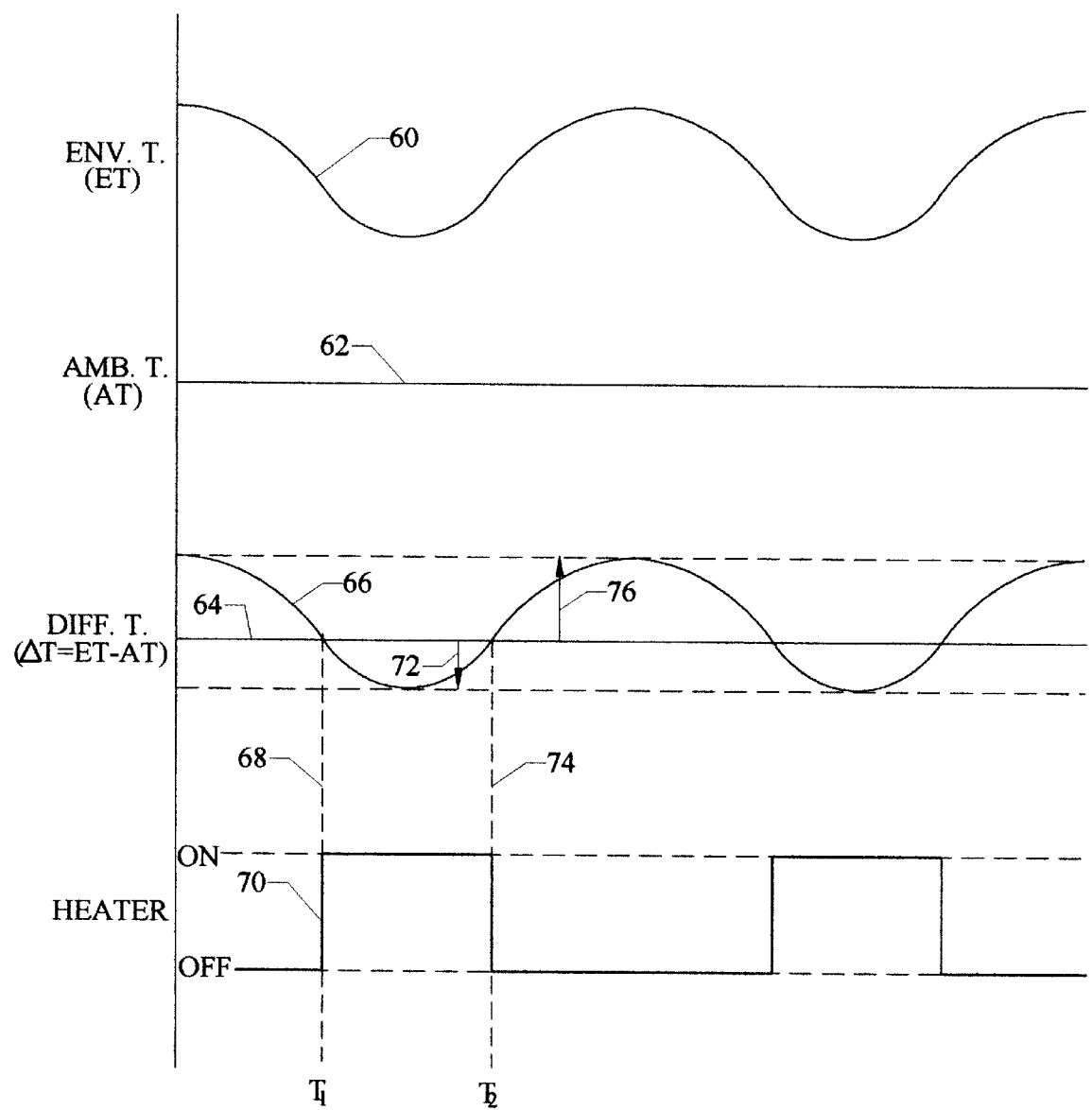
FIG. 3 is a plot of the process of the general controller functions in terms of airship envelope air temperature, ambient air temperature, difference temperature relative to the operator selected difference temperature setpoint value, and controller output to heater operation as illustrated in FIG. 2.

General Operations—FIG. 3

FIG. 3 is a plot diagram that illustrates the general function of thermal airship buoyancy controller described in FIG. 2. Data, as measured over a period of time by envelope air temperature sensor 34, is represented as envelope air temperature plot 60. Data, as measured over a period of time by ambient air temperature sensor 38, is represented as ambient air temperature plot 62. As previously noted, the measures of envelope and ambient air temperatures are expressed in the form of a temperature difference signal 48, and represented in FIG. 3 as temperature difference plot 66. As previously noted, temperature difference signal 48 is input to process controller 50 along with operator selected difference temperature setpoint value 52, and represented in FIG. 3 as operator selected difference temperature setpoint plot 64.

When the captive air inside airship envelope 24 cools, difference temperature plot 66 drops below operator selected difference temperature setpoint plot 64, as indicated at $T_1$, and heater activation 68 is initiated, as represented here by heater status plot 70 as ON. Upon heater activation 68, heater 44 raises the temperature of the captive air inside airship envelope 24 as measured by envelope air temperature sensor 34. The ability of heater 44 input rate to overcome the captive air cooling rate is reflected in the extent to which difference temperature plot 66 drops below operator selected difference temperature setpoint plot 64 before beginning to rise. This is referred to as processor under-shoot 72.

When difference temperature plot 66 rises above operator selected difference temperature setpoint plot 64, as indicated at $T_2$, heater deactivation 74 occurs, as represented by heater status plot 70 as OFF. The ability of the captive air cooling rate to overcome the dispersion of heating after heater deactivation 74 is reflected in the extent to which difference temperature plot 66 rises above operator selected difference temperature setpoint plot 64. This is referred to as processor over-shoot 76.

As can be seen in FIG. 3, the amplitude of ocillations in processor over-shoot 76 and processor under-shoot 72 illustrates the extent to which process controller 50 can hold difference temperature plot 66 at desired operator selected difference temperature setpoint plot 64. These fluctuations in difference temperature plot 66 are directly related to fluctuations in lift. Under certain circumstances these variations in lift may not constitute desirable airship control characteristics. The simple ON and OFF functions of process controller 50 may not adequately control large variations in lift, therefore requiring more precise operation.

Description of the Preferred Embodiments—
Specific

Figure 4:
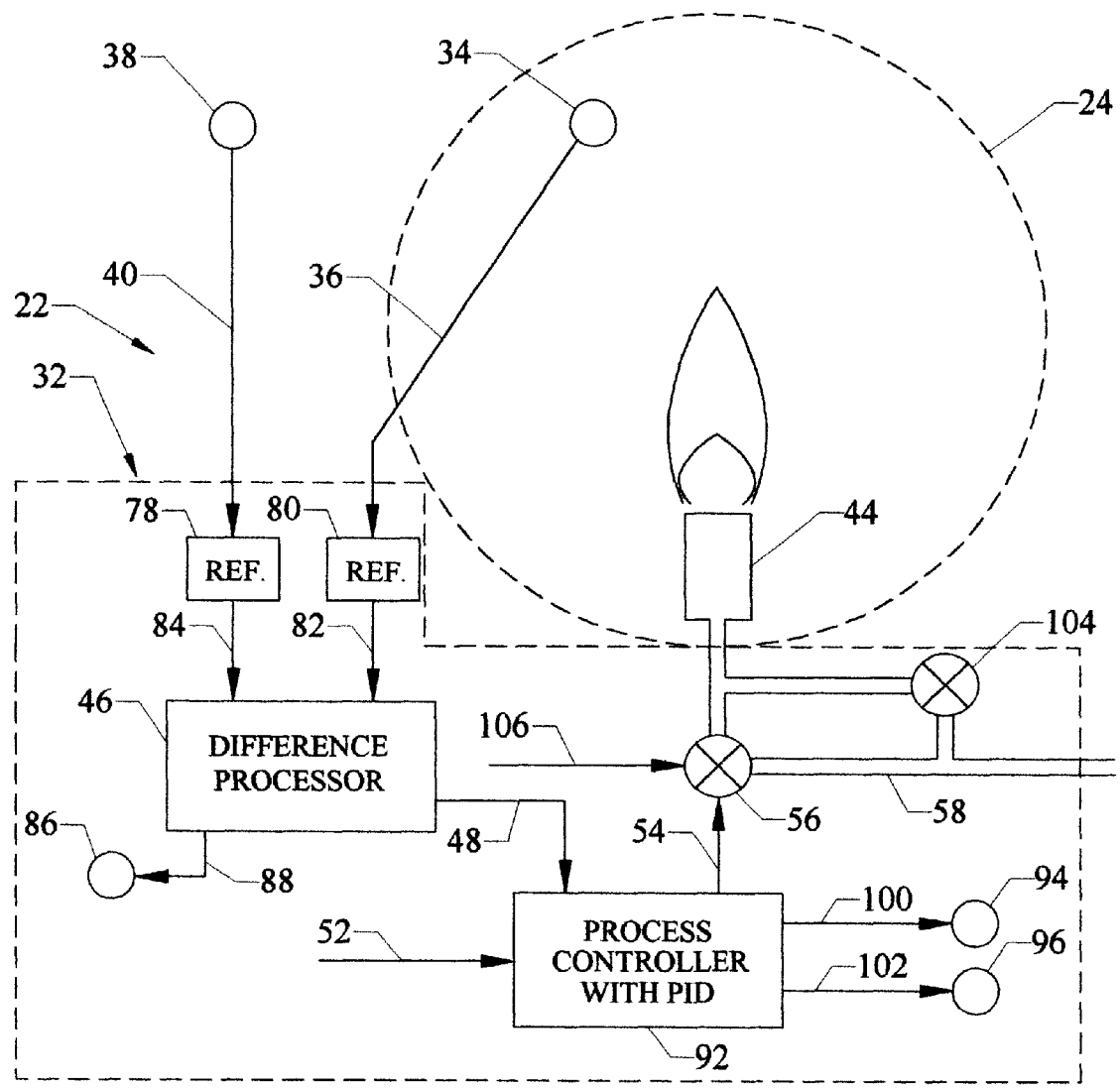
FIG. 4 is a block diagram of the controller with the specific options that are described in the additional preferred embodiments, which enhance the accuracy and user interface of the controller.

The block diagram presented in FIG. 4 illustrates the specific additional embodiments to general thermal airship buoyancy controller assembly 22, as represented in FIG. 2, that can enhance the accuracy of the lift management system described therein. This configuration incorporates the optional additions of ambient sensor reference junction 78 and envelope sensor reference junction 80.

Of the many reference junctions that may be used, a typical, although not exclusive, reference junction provides a 0° C. reference temperature setting for a type T thermocouple and compensation accuracy of ±½° C. Included in this wide variety of reference junctions, the device sold under the trademark OMEGA™, model number LXCJ-T Self-powered Thermocouple Reference Junction, has thus far shown to fulfill the requirements described herein. When placed in the specific sensor circuits, reference junctions 78 and 80 increase the accuracy of envelope air temperature sensor 34 and ambient air temperature sensor 38 by providing constant calibration of the sensor signal against the known reference value. These corrected and calibrated signals are then input to difference processor 46 via ambient reference junction lead 82 and envelope reference junction lead 84.

The optional addition to difference processor 46 in the present configuration is envelope over-temperature alarm 86 and its associated output via envelope over-temperature output lead 88. Envelope over-temperature alarm 86 operates from over-temperature preset limit 90 function of envelope air temperature sensor 34 input, as further illustrated in FIG. 5. Alarm 86 notifies the operator of envelope temperatures is excess of over-temperature preset limit 90 that may be encountered. Alarm 86 can be in the form of a warning light, a sound device, a numerical display, or any other operator alert means and can be any combination of the same.

Basic ON and OFF process controller 50 functions described in FIG. 2 are expanded to include processor controller with PID (proportional, integral and derivative) control 92 in FIG. 4. Process controller 92 greatly improves the systems ability to control processor overshoot 76 and undershoot 72 as well as control for large fluctuations in ambient temperature. Of the many process controllers that may be used, a typical, although not exclusive, controller incorporates the inputs of both an analog source (temperature difference signal 48) and operator selected difference temperature setpoint value 52, the ability, to automatically compensate for changes in generated lift as represented by the changes in temperature difference signal 48 input (proportional, integral, derivative or any combination of such control mode) and processor output 54 of controller function. Included in this wide variety of difference processors, the processor sold under the trademark Newport™, model number ICN77523-A2-DC MICRO-INFINITY PID Temperature/Process Controller, has thus far shown to fulfill the requirement described desorted herein.

Also desired is the option of reference outputs of temperature difference signal 48 relative to operator selected difference temperature setpoint value 52 in the form of two alarms. High range alarm 94 and low range alarm 96 are triggered by temperature range preset limit 98 functions of process controller with PID control 92, as further illustrated in FIG. 5. Alarms 94 and 96 are relayed respectively by way of high range output lead 100 and low range output lead 102. Alarms 94 and 96 can be in the form of warning lights, sound devices, numerical displays, or any other operator alert means and can be any combination of the same. Processor output 54 provides heater valve 56 with on and off and proportional cycling signals that allow the flow of fuel through fuel line 58 to heater 44. Also noted in FIG. 4 are the additions of manually operated heater over-ride valve 104 and electrically activated heater over-ride 106 for heater valve 56. Over-rides 104 and 106 provide the operator with emergency heater 44 operations, if required.

Figure 5:
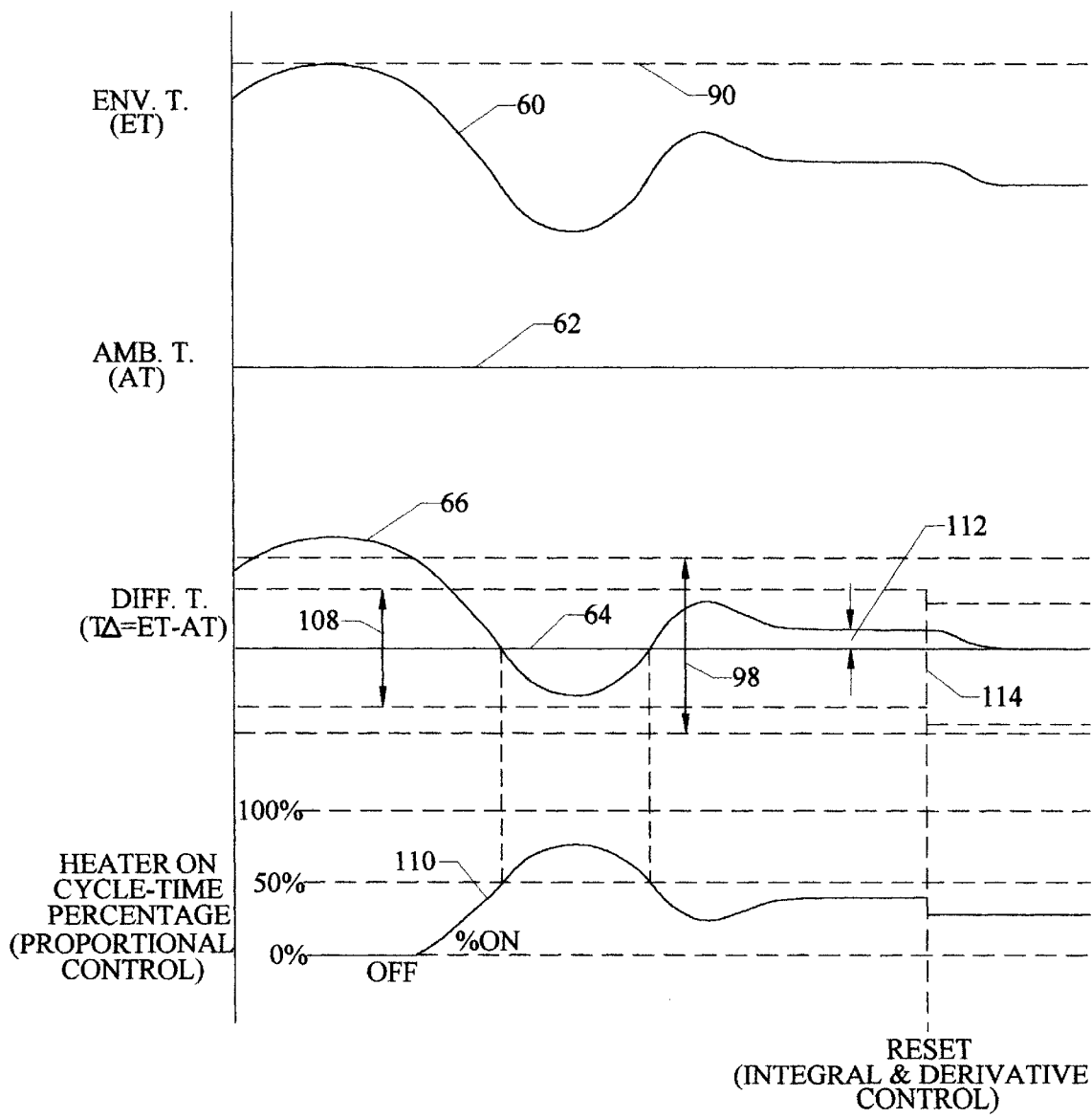
FIG. 5 is a plot of the process of the controller functions as noted in FIG. 4 with the specific options described in the additional preferred embodiments illustrated in FIG. 4.

Specific Operations—FIG. 5

The specific functions of the thermal airship buoyancy controller described in FIG. 4 are illustrated in the plot diagram of FIG. 5. In this description, basic process controller 50 incorporates processor controller with PID (proportional, integral and derivative) control 92 capabilities in which a set proportional band 108 is computed from processor undershoot 72 and processor overshoot 76 data accumulated over a predetermined time period, and is positioned around operator selected difference temperature setpoint plot 64. Heater 44 operation is programmed to function in timed cycles in which on and off times are proportional to the proximity to operator selected difference temperature setpoint plot 64. When difference temperature plot 66 is outside proportional band 108 process controller with PID control 92 operates as an "on and off" controller; either 100% ON or 0% ON, as described in FIG. 2. When difference temperature plot 66 falls within proportional band 108, heater 44 operation is a percentage of the cycle time.in the ratio of its difference from operator selected difference temperature setpoint plot 64, as illustrated by heater ON cycle-time percentage plot 110. When difference temperature plot 66 is at operator selected difference temperature setpoint plot 64, heater 44 operation becomes 50% of the cycle time.

Proportional control can result in actual difference temperature plot 66 stabilizing at a point offset from that of operator selected difference temperature setpoint plot 64. In the integral control function, process controller with PID control 92 will measure the average offset integral 112 over a predetermined period of time and automatically reset 114 proportional band 108 relative to operator selected difference temperature setpoint plot 64 in such a way to allow stabilized difference temperature plot 66 to match that of operator selected difference temperature setpoint plot 64.

The derivative control function of process controller with PID control 92 will compensate for large and rapid swings of difference temperatures that occur when thermal airship 20 transits through air masses of significantly different temperatures. By measuring the rates of change in difference temperature plot 66 over a predetermined period of time, process controller with PID control 92 will automatically reset 114 proportional band 108 to a new range that is proportional to the measured rate in a way that facilitates re-stabilization of difference temperature plot 66 to that of operator selected difference temperature setpoint plot 64.

Conclusions, Ramifications, and Scope

As can be seen, the thermal airship buoyancy controller of this invention "fixes" the operator's desired value of lift by automatically maintaining the set operator selected difference temperature value between the internal air temperature of the airship envelope and the temperature of the outside air. By making the heating process automatic, the thermal airship buoyancy controller removes the burden of heat management from the operator's many tasks and allows the operator to utilize dynamic lift for ascent and descent control. The incorporation of such control algorithms as PID (proportional, integral and derivative) control, the system can "fix" lift values much more accurately and consistently than can be achieved by manual burner operations or with the more simple "ON-OFF" control processors. Specifically, the thermal airship buoyancy controller has the advantages that:

(a) improves heater operations for thermal airships,
(b) reduces pilot demand and enhances overall control of the aircraft,
(c) maintains the unit lift by fixing the difference temperature between the internal temperature of the airship envelope and the ambient temperature of the outside air,
(d) eliminates the pilot in the process of monitoring, maintaining and controlling the heat input to the airship envelope.

While the present invention has been described herein, with references to particular embodiments thereof, a latitude of modification, various changes and substitutions are intended in the foregoing disclosure and will be appreciated that in some instances, some features of the invention will be employed without corresponding use of other features without departing from the scope of the invention as set forth.

Thus the scope of the invention should be determined by the appended claims and their legal equivalents, rather than by the examples given.

What is claimed is:

1. A thermal airship buoyancy controller comprising:
   (a) an airship envelope air temperature sensor and means of temperature data transmission,
   (b) an ambient air temperature sensor and means of temperature data transmission,
   (c) a means of establishing a differential temperature value of said temperature data transmission from said airship envelope air temperature sensor and said temperature data transmission from said ambient air temperature sensor expressed as an output signal,
   (d) a means of comparison between said output signal of said means of establishing a differential temperature value and an operator selected difference temperature setpoint value which will:
      (1) cause a means of adding heat to the airship envelope air when said means of establishing a difference temperature value is below that of said operator selected difference temperature setpoint value, and
      (2) cause a means of suspending said means of adding heat to said airship envelope air when said means of establishing a difference temperature value is above that of said operator selected difference temperature setpoint value,
         whereby said means of comparison elicits said means of adding heat to said airship envelope air as a way of equalizing said comparison, and whereby said means of comparison elicits said means of suspending said means of adding heat to said airship envelope air as a way of said equalizing of said comparison.

2. A thermal airship buoyancy controller of claim 1, further including:
   (a) a calculating means for the range of error in said equalizing of said comparison over a predetermined time period,
   (b) a means of setting said range of error around said operator selected difference temperature setpoint value,
   (c) a means of proportional heater operation within said range of error which will:
      (1) cause said means of adding heat to said airship envelope air proportional to the relative distance below said operator selected difference temperature setpoint value, and
      (2) cause said means of suspending said means of adding heat to said airship envelope air proportional to the relative distance above said operator selected difference temperature setpoint value,
      whereby said means of proportional heater operation of said means of adding heat or said suspending of said means of adding heat to said airship envelope air will provide a means of optimizing the accuracy and consistency of said equalization of said comparison.

3. A thermal airship buoyancy controller of claim 2, further including:
   (a) a calculating means for the average of said range of error,
   (b) a calculating means for the difference offset between said average of said range of error and said operator selected difference temperature setpoint value,
   (c) an adjusting means for said means of proportional heater operation by the value of said difference offset, thereby making said average of said range of error coincident with said operator selected difference temperature setpoint value,
      whereby said adjusting means for said means of proportional heater operation will provide said means of optimizing the accuracy and consistency of said equalization of said comparison.

4. A thermal airship buoyancy controller of claim 3, further including:
   (a) a calculating means for the rate of change in said means of establishing a differential temperature over a predetermined time period,
   (b) an adjusting means for said means of proportional heater operation relative to said rate of change, thereby making the rate of said equalization of said comparison coincident with said rate of change,
      whereby said adjusting means for said means of proportional heater operation will provide said means of optimizing the accuracy and consistency of said equalization of said comparison.

5. A process, for establishing and maintaining a desired factor of lift in a thermal airship comprising the steps of:
   (a) providing a sensor which is able to register the temperature of the air inside the envelope of a thermal airship,
   (b) providing a sensor which is able to register the temperature of the ambient air surrounding the envelope of a thermal airship,
   (c) providing a means of deriving the measured difference temperature between said temperature of the air inside the envelope and said temperature of the ambient air surrounding the envelope,
   (d) providing a processor incorporating a difference temperature setpoint input means which a human operator can use to establish a desired difference temperature reference value which is compared to said means of deriving the measured difference temperature which will:
      (1) provide a means of initiation of heater operation when said means of deriving the measured difference temperature is below that of said difference temperature setpoint as a means of increasing said temperature of the air inside the envelope of a thermal airship, and
      (2) provide a means of suspension of said heater operation when said means of deriving the measured difference temperature is above that of said difference temperature setpoint as a means of decreasing said temperature of the air inside the envelope of a thermal airship,
      whereby said means of initiation of said heater operation is elicited by said comparison as a means of increasing said temperature of the air inside the envelope of a thermal airship and thereby increasing said means of deriving the measured difference temperature in a way which will cause an equaling to that of said difference temperature setpoint, and
      whereby said means of suspension of said heater operation is elicited by said comparison as a means of decreasing said temperature of the air inside the envelope of a thermal airship and thereby decrease said means of deriving the measured difference temperature in a way which will cause said equaling to that of said difference temperature setpoint.

6. A process for establishing and maintaining a desired factor of lift in a thermal airship of claim 5, further including:
   (a) a means of calculating the error range in said equaling to that of said difference temperature setpoint over a predetermined time period,
   (b) a means of placing said error range around said difference temperature setpoint,
   (c) a proportional heater operation means within said error range which will:
      (1) provide said means of initiation of said proportional heater operation means proportional to the relative distance below said difference temperature setpoint, and
      (2) provide said means of suspension of said proportional heater operation means proportional to the relative distance above said difference temperature setpoint,
      whereby said means of initiation or said means of suspension of said proportional heater operation means will provide a means of optimizing the accuracy and consistency of said equaling to that of said difference temperature setpoint.

7. A process for establishing and maintaining a desired factor of lift in a thermal airship of claim 6, further including:

(a) a means of calculating the average of said error range, (b) a means of calculating for the difference offset between said average of said error range and said difference temperature setpoint, (c) a means of adjusting for said proportional heater operation means by the value of said difference offset, thereby making said average of said error range coincident with said difference temperature setpoint, whereby said means of adjusting for said proportional heater operation means will provide said means of optimizing the accuracy and consistency of said equaling to that of said difference temperature setpoint.

8. A process for establishing and maintaining a desired factor of lift in a thermal airship of claim 7, further including:

(a) a means of calculating for the change rate in said means of deriving said measured difference temperature over a predetermined period of time, (b) a means of adjusting for said proportional heater operation means relative to said change rate, thereby making the rate of said equaling to that of said difference temperature setpoint coincident with said change rate, whereby said means of adjusting for said proportional heater operation means will provide said means of optimizing the accuracy and consistency of said equaling to that of said difference temperature setpoint.

* * * * *